United States Patent
Sun et al.

(10) Patent No.: US 11,631,237 B1
(45) Date of Patent: Apr. 18, 2023

(54) INFRARED THERMAL IMAGE CLASSIFICATION AND HOT SPOT POSITIONING METHOD OF PHOTOVOLTAIC PANEL

(71) Applicant: Northeast Electric Power University, Jilin (CN)

(72) Inventors: Lingfang Sun, Jilin (CN); Guoqiang Zhu, Jilin (CN); Xinlin Li, Jilin (CN); Jianxin Yan, Jilin (CN); Le Ma, Jilin (CN); Xia Li, Jilin (CN); Guoliang Feng, Jilin (CN); Chunyang Fu, Jilin (CN); Huichao Ji, Jilin (CN); Heng Piao, Jilin (CN)

(73) Assignee: NORTHEAST ELECTRIC POWER UNIVERSITY, Jilin (CN)

( * ) Notice: Subject to any disclaimer, the term of this patent is extended or adjusted under 35 U.S.C. 154(b) by 0 days.

(21) Appl. No.: 17/965,355

(22) Filed: Oct. 13, 2022

(30) Foreign Application Priority Data

Nov. 23, 2021 (CN) .......................... 202111392296.2

(51) Int. Cl.
*G06V 10/764* (2022.01)
*G06V 20/60* (2022.01)

(52) U.S. Cl.
CPC ............ *G06V 10/764* (2022.01); *G06V 20/60* (2022.01)

(58) Field of Classification Search
CPC .......... G06N 20/00; G06N 3/006; G06N 3/02; G06N 3/0445; G06N 3/0454; G06N 3/0472; G06N 3/084; G06N 3/088; G06N 3/126; G06N 5/046; G06N 7/005; G06N 3/0427; G06N 20/10; G06N 5/003; G06N 20/20;

(Continued)

(56) References Cited

FOREIGN PATENT DOCUMENTS

| CN | 109948693 A | 6/2019 |
| CN | 110414601 A | 11/2019 |

(Continued)

OTHER PUBLICATIONS

Tian, A New GAN-Based Approach to Data Augmentation and Image Segmentation for Crack Detection in Thermal Imaging Tests, 2021, Springer (Year: 2021).*

(Continued)

*Primary Examiner* — Alex Kok S Liew (74) *Attorney, Agent, or Firm* — Stuart H. Mayer; Mayer & Williams PC (57) ABSTRACT

Disclosed is an infrared thermal image classification and hot spot positioning method of a photovoltaic panel, comprising following steps: constructing a photovoltaic panel infrared thermal image data set, preprocessing the image data set, and dividing into a training set and a testing set according to a preset proportion; training an auxiliary generating countermeasure network based on the training set to obtain a trained generator and a trained discriminator, training an encoder by combining the image data in the training set with the generator, and fixing the parameters of a trained encoder; inputting the image data in the test set into a trained discriminator to obtain a photovoltaic image classification result; inputting images in the test set into the trained encoder, and then inputting the images into the generator for a reconstruction; comparing pixels of the input images with the reconstructed infrared thermal images, and positioning hot spots.

8 Claims, 6 Drawing Sheets

(58) Field of Classification Search
CPC ...... G06N 3/0436; G06N 3/086; G06N 3/049;
G06N 3/08; G06N 5/04; G06N 5/025;
G06N 10/00; G06N 10/20; G06N 10/40;
G06N 10/60; G06N 10/80; G06N 3/04;
G06N 5/043
See application file for complete search history.

(56) References Cited

FOREIGN PATENT DOCUMENTS

| | | | |
|---|---|---|---|
| CN | 111337243 A | 6/2020 | |
| CN | 112164038 A | 1/2021 | |
| CN | 112686894 A | 4/2021 | |
| WO | 2020/239196 A1 | 12/2020 | |

OTHER PUBLICATIONS

Wang, Thermal Infrared Pedestrian Segmentation Based on Conditional GAN, Sep. 2019, IEEE Journal of Photovoltaics (Year: 2019).*

Wang, "Thermal Infrared Pedestrian Segmentation Based on Conditional GAN," Dec. 2019, IEEE Transactions on Image Processing (Year: 2019).*

Tang, et al. "Jamming Recognition Based on AC-VAEGAN" Journal: 2020 15th IEEE International Conference on Signal Processing (ICSP): Publication date: Jan. 18, 2021.

Fu et al. "Parametric fault diagnosis method for power converters based on ACGAN" Journal: Machinery Manufacturing and Automation—Publication date: Dec. 31, 2019.

* cited by examiner

INFRARED THERMAL IMAGE CLASSIFICATION AND HOT SPOT POSITIONING METHOD OF PHOTOVOLTAIC PANEL

CROSS-REFERENCE TO RELATED APPLICATIONS

This application claims priority to Chinese Patent Application No. 202111392296.2, filed on Nov. 23, 2021, the contents of which are hereby incorporated by reference.

TECHNICAL FIELD

The application relates to the technical field of image classification and hot spot detection and positioning, and in particular to an infrared thermal image classification and hot spot positioning method of photovoltaic panels.

BACKGROUND

In recent years, in order to meet the power demand of sustainable and eco-friendly energy production, solar photovoltaic power generation plays an important role as clean energy. However, the manufacturing defects, wear and hot spot faults of photovoltaic modules directly lead to the reduction of the output power of photovoltaic system, shortening the service life, and even causing fire in severe cases. Therefore, it is of great practical significance to prevent the factors that reduce the output power and to determine and classify the faults in time.

Hot spot detection is a key problem to reduce the output power of photovoltaic systems, and bird droppings, dust accumulation, uneven shading and local component damage are easy to form hot spots. Therefore, an efficient hot spot detection and positioning method is necessary for the reliable and durable photovoltaic systems.

At present, the commonly used hot spot detection methods include a parallel bypass diode method, a current-voltage method and infrared imaging technology. The first two methods are easy to destroy the photovoltaic array structure and have low efficiency. Infrared imaging technology reflects the working temperature characteristics of photovoltaic arrays by using infrared images, and detects hot spots by image analysis. With the development of image processing technology of computer vision, the accuracy of classification and target detection using machine learning is constantly improved, and the generative countermeasure network develops rapidly in image processing and image classification. Therefore, the application provides an infrared thermal image classification and hot spot positioning method of photovoltaic panels.

SUMMARY

The objective of the present application is to overcome the above problems in the prior art, and propose an infrared thermal image classification and hot spot positioning method of photovoltaic panels, which classifies the hot spots and locates the hot spots by image processing technology.

To achieve the above objective, the present application provides following solutions.

An infrared thermal image classification and hot spot positioning method of photovoltaic panel, including:

S1, constructing a photovoltaic panel infrared thermal image data set, preprocessing the image data set, and dividing the image data set into a training set and a testing set according to a preset proportion;

S2, training an auxiliary generating countermeasure network based on the training set to obtain a trained generator and a trained discriminator, training an encoder by combining the image data in the training set with the generator, and fixing the parameters of a trained encoder;

S3, inputting the image data in the test set into a trained discriminator to obtain a photovoltaic image classification result and determine a fault type of the photovoltaic panel;

S4, inputting images in the test set into the trained encoder to map into feature vectors, and then inputting the images into the generator for a reconstruction to generate healthy infrared thermal images; and S5, comparing pixels of the images in the test set with the reconstructed infrared thermal images, and positioning hot spots to obtain a positioning result.

Optionally, in the S1, a preprocessing process of the image data set includes random rotation, cropping and normalization of the images.

Optionally, the preprocessed images are classified into healthy images, non-fault hot spot images and fault hot spot images; wherein, the healthy images are photovoltaic panel images with uniform solar irradiance distribution; photovoltaic panel images with uneven solar irradiance distribution caused by shadow shading are non-fault hot spot images; photovoltaic panel images with local spots caused by dirt and photovoltaic module fault are fault hot spot images.

Optionally, three classifications of healthy images, non-fault hot spot images and fault hot spot images are written in a form of labels, so that each image in the photovoltaic panel infrared thermal image data set corresponds to a label.

Optionally, training set data accounts for 70% of a total data set, and test set data accounts for 30% of the total data set.

Optionally, in the S2, the auxiliary generating countermeasure network is used to make the generator designate to generate label images, and label information can also use the discriminator to expand a loss function, so as to increase performance of the whole countermeasure network, wherein the networks of the generator and the discriminator are all five-layer neural networks.

Optionally, in the S2, the process of training the encoder includes:

inputting health image data in the training set into the encoder, mapping the health image data into the feature vectors, fixing auxiliary labels of the generator as health labels, and then inputting the feature vectors and the fixed labels into the generator for an image reconstruction to obtain healthy infrared thermal images, so that the encoder training process is finished.

Optionally, in the S3, the process of obtaining the photovoltaic image classification result includes: obtaining a prediction score by the discriminator, and obtaining the photovoltaic panel image classification result based on the prediction score and Argmax function.

Optionally, in the S5, the images in the test set is compared with the reconstructed infrared thermal images, and if a pixel residual value is greater than a threshold set by a photovoltaic panel infrared thermal image data, a pixel position is a hot spot position.

The application has the beneficial effects that:

According to the application, through the image processing technology, the discriminator is used to accurately classify the faults of the photovoltaic group, the pixel comparison between the test set image and the reconstructed thermal image is carried out to determine the position of the hot spot, and a network framework is used to simultaneously realize the multi-classification and positioning functions of the hot spot faults, thus simplifying the detection steps of the hot spot faults of photovoltaic panels; the method utilizes the auxiliary generating confrontation network to reconstruct the image, and the reconstructed image is closer to the healthy image in the real state, so that the pixel comparison is more accurate, and the positioning accuracy of the hot spot is greatly improved.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative labor.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

In order to make the above objectives, characteristics and advantages of the present application more obvious and understandable, the present application will be explained in further detail below with reference to the drawings and detailed description.

Figure 1:
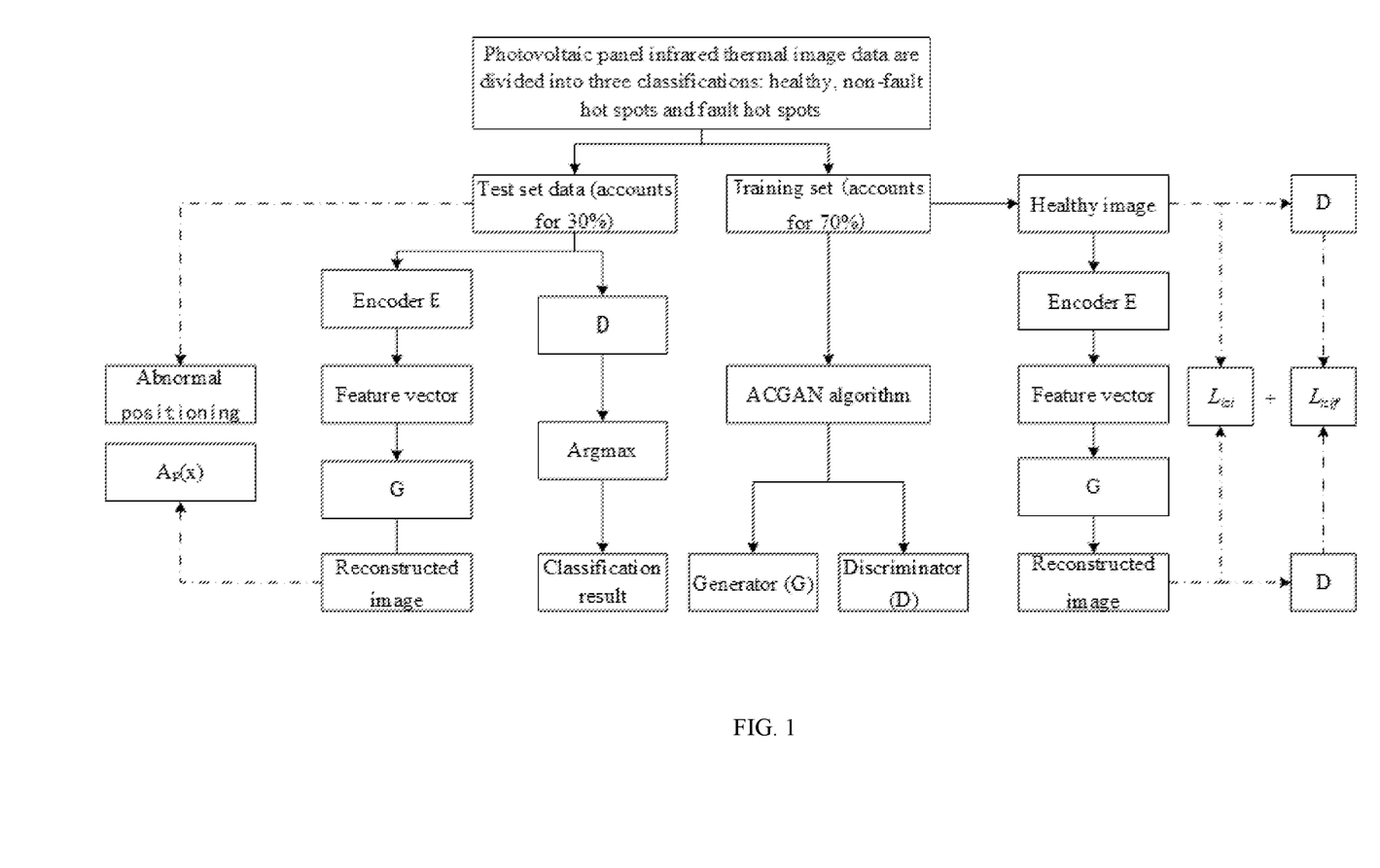
FIG. 1 is a schematic flow diagram of a method in an embodiment of the present application.

An infrared thermal image classification and hot spot positioning method of photovoltaic panel, as shown in the attached FIG. 1, specifically includes the following steps:

S1: building a thermal image data set of photovoltaic panels, dividing the infrared thermal images of photovoltaic panels into three classifications of image data: healthy, non-fault hot spots and fault hot spots, standardizing the image data, and dividing the training set and test set according to the preset proportion.

Figure 2:
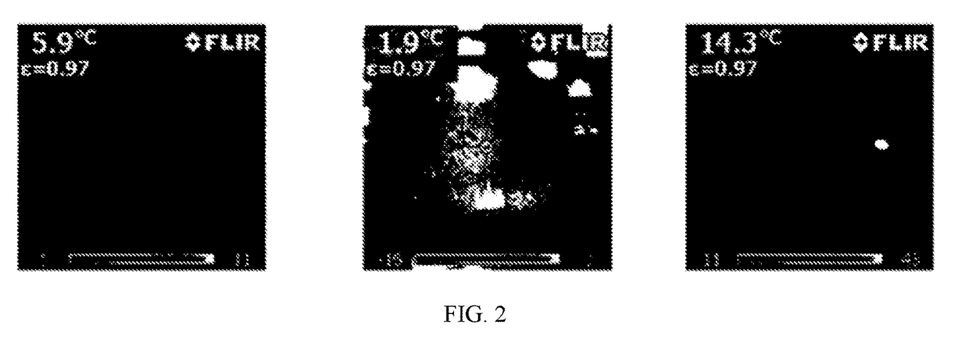
FIG. 2 is a schematic diagram of data set classification in an embodiment of the present application, with healthy, non-fault hot spots and fault hot spots from left to right.

In this embodiment, the thermal images of photovoltaic panels are randomly rotated, cropped and normalized, so that the size of each image is 3*64*64, as shown in FIG. 2. The processed photovoltaic panel infrared thermal image data are divided into three classifications: healthy, non-fault hot spots and fault hot spots, and the labels are written into files to construct a label corresponding to each image in the infrared image data set of photovoltaic panels. The training set data accounts for 70% of the total data set, and the test set data accounts for 30% of the total data set.

Figure 3:
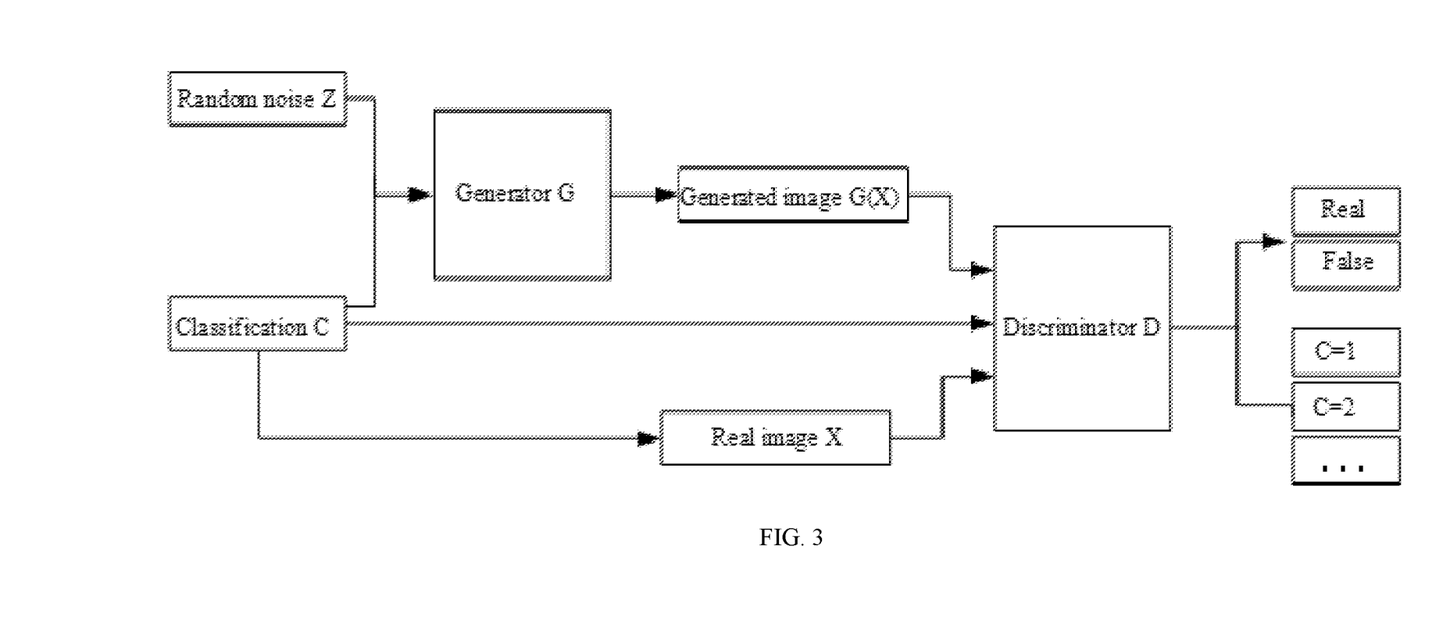
FIG. 3 is a structural diagram of an auxiliary generating countermeasure network in an embodiment of the present application.

S2: using the training set in the S1 to train the auxiliary generative countermeasure network, as shown in FIG. 3, and fixing the parameters of the trained generator and discriminator.

The network of discriminators and generators of the auxiliary generative countermeasure network are a five-layer neural networks. The auxiliary generation countermeasure network can effectively use the class label information, which not only enables the generator to specify the label image to be generated, but also the label information expands the loss function by using the discriminator, thus increasing the performance of the whole countermeasure network.

In this embodiment, the loss function for training auxiliary generative countermeasure network are is as follows:

$$L_S E_{x \sim p_{data}}[\log P(S=real|x_{real})]+E_{z \sim p_z}[\log P(S=fake|x_{fake})] \quad (1),$$

where $L_s$ is the data source loss function, $E(*)$ is the expected value of the distribution function, $P_{data}(x)$ is the real data distribution, $P_x(z)$ is the data distribution of Gaussian noise z, $S=real \oplus x_{real}$ is the input real data and $s=fake|x_{fake}$ is the input generated data.

$$L_C = E_{x \sim p_{data}}[\log P(C=c|x_{real})]+E_{z \sim p_z}[\log P(C=c|x_{fake})] \quad (2),$$

where $L_C$ is the loss function of data category, $C=c|x_{real}$ is the real data of category, and $(X=c|x_{fake})$ is the generated data of category.

Formula (1) is the loss function for judging whether the data is true or false, and the objective of the discriminator is to maximize $L_S$, that is, the discriminator is expected to correctly distinguish the true and false data; the goal of the generator is to minimize $L_S$, that is, the generator is expected that the discriminator cannot correctly distinguish false data.

Formula (2) is the loss function of data classification. Both the discriminator and the generator are committed to classify correctly, so the goals are all to minimize $L_c$.

The goal of the discriminator is to maximize the loss function $L_D=L_c+L_s$, and the goal of the generator is to maximize the loss function $L_D=L_c-L_s$. The two are trained against each other until Nash equilibrium is reached.

Figure 4:
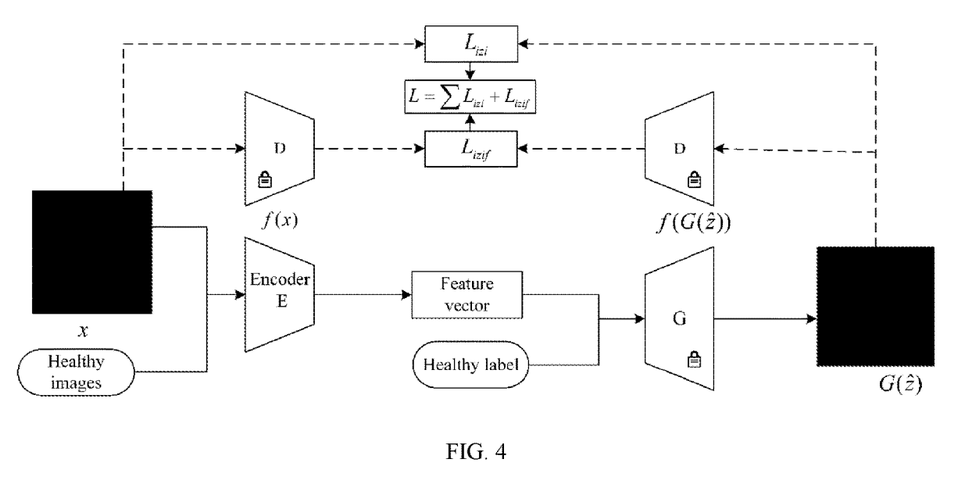
FIG. 4 is a structural diagram of encoder training in an embodiment of the present application.

S3: training an encoder by using the healthy photovoltaic image data from the training set in S1 and the generator trained in S2, so as to map the images into feature vectors, and finally fixing the parameters of the trained encoder.

The training data of the training the encoder only contains the health data in the training set of S1. The training process is shown in FIG. 4. The healthy images are input the encoder to map to the feature vectors, and the auxiliary label of the generator is fixed as the healthy label. Then, the feature vector and the fixed label are input into the generator for image reconstruction.

The loss function of the training encoder is:

$$L(x) = L_{b3} \left| L_{b4} - \frac{1}{n}\|x - G(E(x))\|^2 + \frac{k}{n_d}\|f(x) - f(G(E(x)))\|^2 \right., \quad (3)$$

where x is the input image, $G(E(x))$ is the reconstructed image, $f(*)$ is the characteristic value of the middle layer of the discriminator, $L_{izi}$ is the loss function of the real data and the reconstructed data guiding the encoder training, $L_{izi_f}$ is the loss function of the discriminator guiding the encoder training, n is the number of pixels in each image, k is the weight factor, and $n_d$ is the dimension represented by the middle characteristic of the discriminator.

The loss function of the training encoder in Formula (3) consists of two parts. In $L_{izt}$, the mean square error loss of the input image x and the reconstructed image G(E(x)) is minimized; In $L_{izif}$, the image x and the reconstructed image G(E(x)) are respectively input into the discriminator to extract the characteristic value $f(*)$ of the middle layer of the discriminator, and the mean square error loss of $f(x)$ and $f(G(E(x)))$ is minimized.

Figure 5:
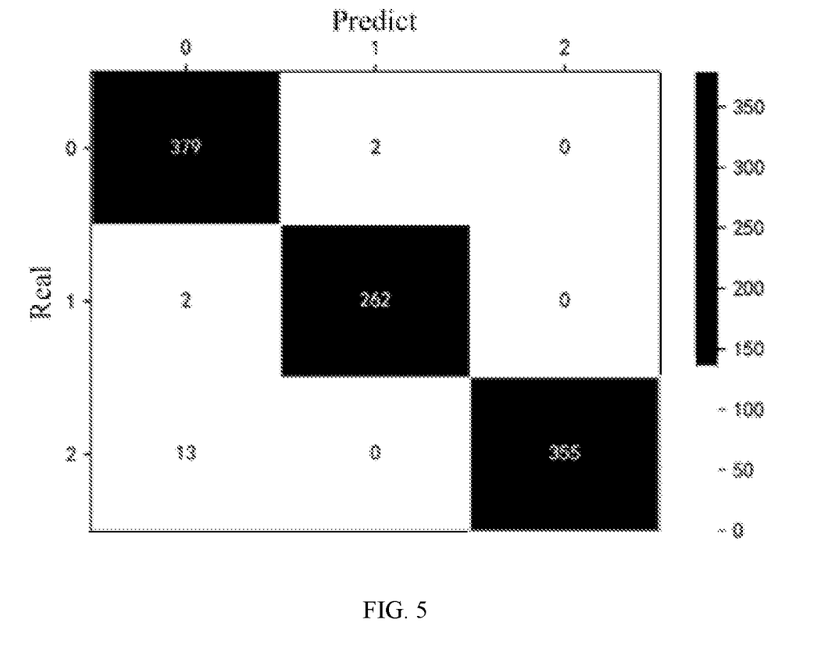
FIG. 5 is a confusing proof diagram for judging classification performance provided in an embodiment of the present application.

S4: inputting the photovoltaic panel infrared thermal image data in the test set into the trained discriminator, and the discriminator gives a classification prediction value to the input data, and the classification prediction value obtains the photovoltaic panel image classification result through Argmax function.

Classify the image data in the test set by using the discriminator with good classification ability trained in S2. The classification performance is shown in the confusion matrix of FIG. 5.

Figure 6:
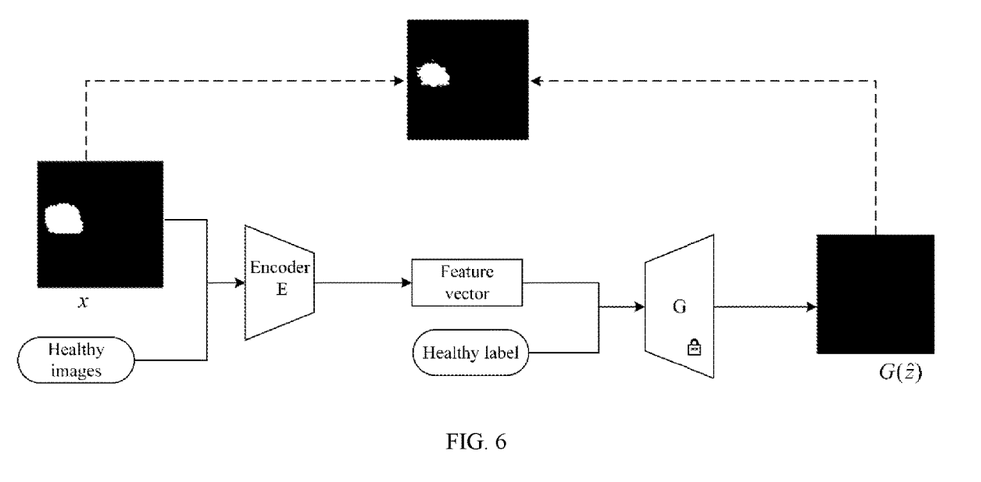
FIG. 6 is an anomaly detection positioning diagram in an embodiment of the present application.

S5: inputting the infrared thermal images of photovoltaic panels in the test set into a trained encoder to map into feature vectors, and inputting the feature vectors and health labels together into a generator to reconstruct healthy thermal images; finally, the pixel comparison between the test set image and the reconstructed thermal image is carried out to determine the position of the hot spot.

In this embodiment, after the encoder training in S3 is completed, the test set image in S5 is mapped from the image space to the characteristic space by the encoder, and then mapped from the characteristic space to the healthy version of the image by the generator. Finally, the abnormal positioning is carried out by comparing the pixels of the test image with the reconstructed healthy image, and the abnormal score is obtained.

The abnormal score $A_s(x)$ for abnormal faults is as follows:

$$A_s(x) = \frac{1}{n} \| x - G(E(x)) \|^2, \quad (4)$$

where x is the input image, G(E(x)) is the reconstructed image, and n is the number of pixels in each image.

Formula (4) is the abnormal score for the test image. Generally, the abnormal score of the healthy image is low, and the abnormal score of the faulty image is high. The health status of the image can be preliminarily distinguished according to the abnormal score of each kind of image, and the severity of such faults can be judged for timely maintenance.

The method for abnormal positioning of the test image is as follows (5):

$$A_p(x) = |x - G(E(x))| \quad (5),$$

where $A_p(x)$ is the absolute value of pixel residual, x is the input image, and G(E(x)) is the reconstructed image.

The formula (5) is the abnormal positioning of the test image. By comparing the pixels of the input test image and the reconstructed healthy image, the pixel with the pixel residual error greater than the set threshold is the abnormal position. The abnormal positioning test results are shown in FIG. 6.

According to the application, through the image processing technology, the discriminator is used to accurately classify the faults of the photovoltaic group, the pixel comparison between the test set image and the reconstructed thermal image is carried out to determine the position of the hot spot, and a network framework is used to simultaneously realize the multi-classification and positioning functions of the hot spot faults, thus simplifying the detection steps of the hot spot faults of photovoltaic panels; the method utilizes the auxiliary generating confrontation network to reconstruct the image, and the reconstructed image is closer to the healthy image in the real state, so that the pixel comparison is more accurate, and the positioning accuracy of the hot spot is greatly improved.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. An infrared thermal image classification and hot spot positioning method of a photovoltaic panel, comprising:
   S1, constructing a photovoltaic panel infrared thermal image data set, preprocessing the image data set, and dividing the image data set into a training set and a testing set according to a preset proportion;
   S2, training an auxiliary generating countermeasure network based on the training set to obtain a trained generator and a trained discriminator, training an encoder by combining the image data in the training set with the generator, and fixing parameters of a trained encoder;
   wherein the process of training the encoder comprises:
   inputting health image data in the training set into the encoder, mapping the health image data into feature vectors, fixing auxiliary labels of the generator as health labels, and then inputting the feature vectors and fixed labels into the generator for an image reconstruction to obtain healthy infrared thermal images to complete an encoder training process;
   S3, inputting the image data in a test set into a trained discriminator to obtain a photovoltaic image classification result and determine a fault type of the photovoltaic panel;
   S4, inputting images in the test set into the trained encoder to map into the feature vectors, and then inputting the images into the generator for a reconstruction to generate healthy infrared thermal images; and
   S5, comparing pixels of the images in the test set with the reconstructed infrared thermal images, and positioning hot spots to obtain a positioning result.

2. The infrared thermal image classification and hot spot positioning method of a photovoltaic panel according to claim 1, wherein in the S1, a preprocessing process of the image data set comprises random rotation, cropping and normalization of the images.

3. The infrared thermal image classification and hot spot positioning method of a photovoltaic panel according to claim 2, wherein the preprocessed images are classified into healthy images, non-fault hot spot images and fault hot spot images; the healthy images are photovoltaic panel images with uniform solar irradiance distribution; photovoltaic panel images with uneven solar irradiance distribution caused by shadow shading are the non-fault hot spot images;

and photovoltaic panel images with local spots caused by dirt and photovoltaic module fault are the fault hot spot images.

4. The infrared thermal image classification and hot spot positioning method of a photovoltaic panel according to claim 3, wherein three categories of the healthy images, the non-fault hot spot images and the fault hot spot images are written in a form of labels, so that each image in the photovoltaic panel infrared thermal image data set corresponds to a label.

5. The infrared thermal image classification and hot spot positioning method of a photovoltaic panel according to claim 1, wherein the training set data accounts for 70% of a total data set, and the test set data accounts for 30% of the total data set.

6. The infrared thermal image classification and hot spot positioning method of a photovoltaic panel according to claim 1, wherein in the S2, the auxiliary generating countermeasure network is used to make the generator designate to generate label images, and the category labels also use the discriminator to expand a loss function, so as to improve performance of the whole countermeasure network, and the networks of the generator and the discriminator are all five-layer neural networks.

7. The infrared thermal image classification and hot spot positioning method of a photovoltaic panel according to claim 1, wherein in the S3, the process of obtaining the photovoltaic image classification result comprises: obtaining a prediction score by the discriminator, and obtaining the photovoltaic panel image classification result based on the prediction score and Argmax function.

8. The infrared thermal image classification and hot spot positioning method of a photovoltaic panel according to claim 1, wherein in the S5, the images in the test set is compared with the reconstructed infrared thermal images, and if a pixel residual value is greater than a threshold set by a photovoltaic panel infrared thermal image data, a pixel position is a hot spot position.

* * * * *